(12) United States Patent
Weiss et al.

(10) Patent No.: US 9,896,630 B2
(45) Date of Patent: Feb. 20, 2018

(54) PROCESS FOR HYDROCONVERTING OIL FEEDS IN FIXED BEDS FOR THE PRODUCTION OF LOW SULPHUR FUELS

(71) Applicant: IFP ENERGIES NOUVELLES, Rueil-Malmaison (FR)

(72) Inventors: Wilfried Weiss, Valencin (FR); Isabelle Guibard, St. Symphorien D'Ozon (FR); Rejane Dastillung, Lyons (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 380 days.

(21) Appl. No.: 14/363,396

(22) PCT Filed: Nov. 8, 2012

(86) PCT No.: PCT/FR2012/000446
§ 371 (c)(1),
(2) Date: Jun. 6, 2014

(87) PCT Pub. No.: WO2013/083883
PCT Pub. Date: Jun. 13, 2013

(65) Prior Publication Data
US 2014/0332444 A1  Nov. 13, 2014

(30) Foreign Application Priority Data

Dec. 7, 2011 (FR) .................... 11 03758

(51) Int. Cl.
*C10G 65/12* (2006.01)
*C10G 65/04* (2006.01)
*C10L 1/08* (2006.01)

(52) U.S. Cl.
CPC ............ *C10G 65/12* (2013.01); *C10G 65/04* (2013.01); *C10L 1/08* (2013.01); *C10G 2300/1011* (2013.01); *Y02P 30/20* (2015.11)

(58) Field of Classification Search
CPC ........ C10G 2300/202; C10G 2300/205; C10G 2300/206; C10G 2300/208; C10G 45/04; C10G 65/00; C10G 65/04
See application file for complete search history.

(56) References Cited

U.S. PATENT DOCUMENTS

| | | | |
|---|---|---|---|
| 6,306,287 B1 | 10/2001 | Billon et al. | |
| 6,342,152 B1 | 1/2002 | Yoshita | |
| 2010/0155293 A1* | 6/2010 | Verstraete | C10G 45/08 208/49 |

FOREIGN PATENT DOCUMENTS

| | | |
|---|---|---|
| FR | 2782728 A1 | 3/2000 |
| FR | 2784687 A1 | 4/2000 |
| FR | 2950072 A1 | 3/2011 |

OTHER PUBLICATIONS

U.S. Oil & Refining Co, VGO Product Specification.*
International Search Report dated Mar. 22, 2013 issued in corresponding PCT/FR2012/000446 application (pp. 1-2).

* cited by examiner

*Primary Examiner* — Renee Robinson
*Assistant Examiner* — Derek N Mueller
(74) *Attorney, Agent, or Firm* — Millen, White, Zelano and Branigan, P.C.

(57) ABSTRACT

A process for the conversion of oil feeds for the production of low sulphur fuels by fixed bed hydrodemetallization of the feed using an upstream system of fixed bed swing reactors; fixed bed hydrocracking of the hydrodemetallized effluent in the presence of a hydrocracking catalyst; separation in order to obtain a heavy fraction; hydrodesulphurization of the heavy fraction in which hydrogen is reinjected.

17 Claims, 2 Drawing Sheets

PROCESS FOR HYDROCONVERTING OIL FEEDS IN FIXED BEDS FOR THE PRODUCTION OF LOW SULPHUR FUELS

The present invention relates to the refining and to the conversion of heavy hydrocarbon fractions containing, inter alia, sulphur-containing impurities. More particularly, it relates to a process for the conversion of heavy oil feeds for the production of fuel bases of the vacuum distillate, atmospheric residue and vacuum residue type, in particular bunker fuel bases with a low sulphur content. The process of the invention can also be used to produce atmospheric distillates (naphtha, kerosene and diesel), vacuum distillates and light gases (C1 to C4).

Although the terrestrial industry has been subjected to stringent regulations regarding the sulphur contents of fuel bases (gasoline, diesel) over the past decades, until now the sulphur content in marine fuels has not been as restricted. Fuels currently on the market contain up to 4.5% by weight of sulphur. This means that shipping has become the principal source of sulphur dioxide ($SO_2$) emissions.

In order to reduce its emissions, the International Maritime Organization has issued recommendations in terms of specifications concerning marine fuels. Those recommendations are set out in version 2010 of ISO standard 8217 (Annex VI to the MARPOL convention). The specifications concerning sulphur primarily concern future $SO_x$ emissions and come down to a recommendation for sulphur contents equivalent to 0.5% by weight or less in the future. Another highly restrictive recommendation is the quantity of sediments after ageing in accordance with ISO 10307-2, which has to be 0.1% by weight or less. Similarly, the viscosity has to be 380 cSt or less (50° C.).

The present invention can be used to produce fuel bases, in particular bunker fuel bases, complying with the recommendations of the MARPOL convention. The present invention can also be used to obtain fuel bases.

Fixed bed oil feed conversion processes comprising a first hydrodemetallization (HDM) step then a hydrocracking (HCK) step then a hydrodesulphurization (HDS) step are known in the art. Application EP1600491 describes a process for the conversion of crude oil or topped crude oil comprising a first fixed bed HDM step, then a HCK step, then a HDS step aimed at producing fuel bases (kerosene and diesel) with a low sulphur content.

Application FR2950072 also describes a process for the conversion of crude oil or topped crude oil comprising a first fixed bed HDM step, then a HCK step then a HDS step. That process comprises one or more swing reactor systems.

None of those applications describes the production of a heavy fuel complying with the new recommendations.

The present invention adapts and improves the conversion processes described in the prior art for the production of fuel bases with low sulphur contents in particular, but also for the production of atmospheric distillates and/or vacuum distillates.

More particularly, the invention concerns a process for the conversion of a hydrocarbon feed with a sulphur content of at least 0.1% by weight, an initial boiling point of at least 300° C. and an end point of at least 440° C., in which:
 a) said feed undergoes a hydrodemetallization treatment in a fixed bed hydrodemetallization section (HDM) comprising one or more fixed bed hydrodemetallization zones preceded by at least two hydrodemetallization guard zones, also fixed bed, disposed in series for use in a cyclic manner consisting of the successive repetition of steps a'') and a''') defined below:

a') a step in which the guard zones are used together for a period at most equal to the deactivation and/or plugging time of one of them;
 a'') a step during which the deactivated and/or plugged guard zone is short-circuited and the catalyst it contains is regenerated and/or replaced by fresh catalyst, and during which the other guard zone(s) is/are in use; and
 a''') a step during which the guard zones are used together, the guard zone for which the catalyst has been regenerated during the preceding step being reconnected and said step being continued for a period at most equal to the deactivation and/or plugging time of one of the guard zones;
 b) at least a portion of the at least partially demetallized effluent is hydrocracked in a hydrocracking section (HCK) containing at least one fixed bed hydrocracking catalyst;
 c) at least a portion of the at least partially hydrocracked effluent undergoes fractionation in order to obtain a light fraction and a heavy fraction;
 d) at least a portion of said heavy fraction is hydrodesulphurized in a hydrodesulphurization section (HDS) containing at least one fixed bed hydrodesulphurization catalyst, and into which hydrogen is reinjected.

The first step comprises fixed bed HDM of the feed. The principal aim of HDM is to reduce the metals content substantially, as well as a first part of the sulphur and other impurities. HDM is generally carried out before a subsequent HDS step in order to protect the HDS catalysts which are sensitive to the metals. The HDM section comprises hydrodemetallization guard zones (or swing reactors) which can be used to augment the operating cycle.

The effluent obtained in the HDM step then undergoes a fixed bed HCK step to transform the feed into lighter cuts, and in particular into the desired distillates (naphtha, kerosene and diesel). This step can thus be used to produce the desired fuel bases.

One of the key steps in the process consists of carrying out fractionation between the HCK step and the HDS step in order to separate the lighter fractions (naphtha, gas oil, but also gases such as $NH_3$, $H_2S$, C1 to C4) from the heavy fraction. The separation step can thus be used to minimize the fraction to be desulphurized in the fixed bed. In this manner, the dimensions of the HDS section may be reduced. Similarly, overcracking of the light fractions, and thus a loss of fuel base yield, is avoided.

The fractionation step can also be used to separate the $H_2S$ contained in the light fraction. Elimination of $H_2S$ is advantageous in order to minimize its concentration (and thus to minimize the partial pressure of $H_2S$) in the HDS section. In fact, too high a concentration of $H_2S$ may have an inhibiting effect on the HDS catalysts.

In order to obtain a sulphur content in the heavy fraction of 0.5% or less by weight, the HDS must be intense. In fact, the sulphur-containing compounds present in the hydrocarbon feed are generally concentrated in the higher boiling point ranges. The heavy fraction is thus refractory to HDS, even more so when it has undergone a hydrocracking step rendering it even more refractory.

In order to facilitate HDS, a high partial pressure of hydrogen ($ppH_2$) (i.e. a higher concentration of hydrogen in the gas) must be used, which is possible via the upstream fractionation step which eliminates the light compounds (gas oil, kerosene, naphtha and gases such as $NH_3$, $H_2S$, C1 to C4, and also hydrogen) and prevents dilution of the $H_2$ in the HDS step. In order to increase this partial pressure, hydrogen is reinjected after fractionation with the heavy fraction in the HDS step. Thus, sufficiently desulphurized fuel bases are obtained which satisfy the recommendations.

In a variation of the process, the effluent obtained after HDS may undergo a separation step (step e) from which at least one fraction of fuel bases (naphtha, kerosene, gas oil) and heavy fractions such as a vacuum distillate, vacuum residue or atmospheric residue which constitute fuel bases, are usually recovered.

The fuel bases produced by the process of the invention have a sulphur content of 0.5% by weight or less. In addition, if the fuel base is constituted by vacuum distillate obtained from the process, the sulphur content may be close to 0.1% by weight.

In a variation of the process, at least a portion of at least one of the heavy fractions obtained by the present process may be sent to a catalytic cracking section (step f) in which it is treated under conditions that can be used to produce, inter alia, a light cycle oil (LCO) and a heavy cycle oil (HCO). These oils may be used as fluxing agents for mixing with fuel bases obtained from the process of the invention in order to constitute the fuel and obtain the target viscosity.

DETAILED DESCRIPTION

The Feed

The feeds treated in the process of the invention are advantageously selected from atmospheric residues, vacuum residues obtained from straight run distillation, crude oils, topped crudes, deasphalted oils, residues from conversion processes such as those obtained from cokefaction, fixed bed, ebullated bed or moving bed hydroconversion, heavy oils of any origin, in particular from bituminous sands or oil shale, bituminous sands or their derivatives, oil shales or their derivatives, alone or as a mixture.

The feeds generally have a sulphur content of at least 0.1% by weight, often at least 1% and very often at least 2%, or even 4%, or even 7% by weight.

The feeds generally have an initial boiling point of at least 300° C. and an end point of at least 440° C., preferably at least 500° C.

In the present invention, the feeds which are treated are preferably atmospheric residues or vacuum residues or mixtures of these residues.

These feeds may advantageously be used as is or diluted by a hydrocarbon co-feed or a mixture of hydrocarbon co-feeds. The co-feed introduced with the feed may be selected from gas oil or vacuum distillate fractions obtained from distillation or from a conversion process such as a catalytic cracking, visbreaking or cokefaction process. These co-feeds may also be selected from products obtained from a fluidized bed catalytic cracking process: a light cycle oil (LCO), a heavy cycle oil (HCO), a decanted oil or a fluidized bed catalytic cracking residue.

The co-feeds may also advantageously comprise cuts obtained from coal or biomass liquefaction processes, aromatic extracts or any other hydrocarbon cuts or even non-oil feeds such as gaseous and/or liquid derivatives (containing no or almost no solids) from thermal conversion (with or without catalyst and with or without hydrogen) of coal, of biomass such as pyrolysis oil or industrial waste (such as for example recycled polymers) or of vegetable oils, algae oils or animal oils.

The co-feeds may be introduced alone or as a mixture.

The Hydrodemetallization Step (HDM) (Step a)

In the present invention, the feed undergoes a HDM step comprising one or more fixed bed HDM zones preceded by at least two HDM guard zones (or swing reactors), also in fixed bed mode.

The hydrodemetallization step may advantageously be carried out at a temperature in the range 300° C. to 500° C., preferably in the range 350° C. to 420° C. and at an absolute pressure in the range 2 MPa to 35 MPa, preferably in the range 10 to 20 MPa. The temperature is normally adjusted as a function of the desired degree of hydrodemetallization. Usually, the HSV is in a range of 0.1 $h^{-1}$ to 5 $h^{-1}$, preferably in the range 0.1 $h^{-1}$ to 2 $h^{-1}$. The quantity of hydrogen mixed with the feed is normally 100 to 5000 normal cubic meters ($Nm^3$) per cubic meter ($m^3$) of liquid feed, usually 200 to 2000 $Nm^3/m^3$ and preferably 300 to 1500 $Nm^3/m^3$. Normally, the hydrodemetallization step is carried out on an industrial scale in one or more reactors in liquid downflow mode.

For the process of the present invention, specific catalysts which are adapted to each step are usually used.

To carry out HDM, the ideal catalyst has to be able to treat asphaltenes in the feed while having a high demetallizing power associated with a high metals retention capacity and a high resistance to coking.

The HDM catalysts are advantageously catalysts comprising at least one metal selected from the group formed by metals from groups VIII (preferably nickel and/or cobalt) and VIB (preferably molybdenum and/or tungsten), used alone or as a mixture, on a porous refractory oxide as a support, said support generally being selected from the group formed by alumina, silica, silica-aluminas, magnesia, clays and mixtures of at least two of these minerals.

The initial active phase of the catalyst placed in the HDM step is generally constituted by nickel and molybdenum. This active phase, which is known to be more hydrogenating than a phase constituted by cobalt and molybdenum, can be used to limit the formation of coke in the pores and thus its deactivation. Preferably, the HDM catalyst comprises at least one doping element deposited on said catalyst and selected from the group formed by phosphorus, boron and silicon.

Examples of catalysts that can be used in the HDM step are indicated in patents EP113297, EP113284, U.S. Pat. No. 5,221,656, U.S. Pat. No. 5,827,421, U.S. Pat. No. 7,119,045, U.S. Pat. No. 5,622,616 et U.S. Pat. No. 5,089,463. Preferably, HDM catalysts are used in the swing reactors.

It is also possible to use a mixed catalyst which is active for both HDM and HDS, both in the HDM section and in the HDS section, as described in patent FR2940143. Prior to injecting the feed, the catalysts used in the process of the present invention have preferably undergone a sulphurization treatment (in situ or ex situ).

The skilled person will readily understand that in the HDM step, HDM reactions are primarily carried out but at the same time, some HDS reactions occur, accompanied by hydrodenitrogenation (HDN), hydrogenation, hydrodeoxygenation, hydrodearomatization, hydroisomerization, hydrodealkylation, hydrocracking, hydrodeasphalting and Conradson carbon reduction reactions. Similarly, in the HDS step, HDS reactions are primarily carried out, accompanied by the reactions cited above. This is also the case for hydrocracking, in which HCK reactions are primarily carried out, accompanied by the reactions cited above.

In accordance with the invention, the fixed bed hydrodemetallization step uses a system of swing reactors (or guard zones) upstream of the principal hydrotreatment reactors. More particularly, the hydrodemetallization step comprises one or more fixed bed hydrodemetallization zones preceded by at least two hydrodemetallization guard zones, also fixed bed, disposed in series for use in a cyclic manner consisting of the successive repetition of steps a") and a'") defined below:

a') a step in which the guard zones are used together for a period at most equal to the deactivation and/or plugging time of one of them;

a") a step during which the deactivated and/or plugged guard zone is short-circuited and the catalyst it contains is regenerated and/or replaced by fresh catalyst, and during which the other guard zone(s) is/are in use; and a'") a step during which the guard zones are used together, the guard zone for which the catalyst has been regenerated and/or replaced during the preceding step being reconnected and said step being continued for a period at most equal to the deactivation and/or plugging time of one of the guard zones.

Preferably, after regenerating and/or replacing the catalyst of one reactor, this reactor is reconnected downstream of the functioning reactor.

The swing reactor system is known from patents FR2681871, FR2784687 and EP1343857. The function of the swing reactors is to protect the downstream principal hydrotreatment reactors by preventing or retarding plugging and/or deactivation in these reactors. In fact, one problem encountered when using fixed beds is plugging, which occurs because of asphaltenes and sediments contained in the feed. Another problem is deactivation of the catalyst because of large deposits of metals which occur during the hydrotreatment reactions. The swing reactors are thus used to augment the operating cycle of the unit by allowing, over a certain time, the replacement of deactivated and/or plugged catalyst only in the swing reactors operating in a cyclic manner without stopping the entire unit.

The deactivation and/or plugging time varies as a function of the feed, the operating conditions of the hydrodemetallization step and the catalyst or catalysts used. It is generally expressed as a drop in the catalytic performance (an increase in the concentration of metals and/or other impurities in the effluent), an increase in the temperature necessary to maintain an activity of the catalyst or, in the specific case of plugging, by a significant increase in the pressure drop. The pressure drop $\Delta p$, expressing a degree of plugging, is measured continuously throughout the cycle over each of the zones and can be defined as an increase in pressure resulting from the partially blocked passage of flow through the zone. Similarly, the temperature is continuously measured throughout the cycle over each of the two zones.

In order to define a deactivation and/or plugging time, at the outset the skilled person defines a maximum tolerable value for the pressure drop $\Delta P$ and/or the operating temperature as a function of the feed to be treated, the operating conditions and the catalysts selected, beyond which the guard zone has to be disconnected. The deactivation and/or plugging time is thus defined as the time at which the limiting pressure drop value and/or temperature is reached. In the case of a process for the hydrotreatment of heavy fractions, the limiting value for the pressure drop is generally 0.3 to 1 MPa (3 to 10 bar), preferably in the range 0.5 to 0.8 MPa (5 to 8 bar). The limiting value for the temperature is generally in the range 400° C. to 430° C., the temperature corresponding, here and in the remainder of the text, to the mean temperature measured over the catalytic bed.

The operating conditions for the swing reactors are generally identical to those of the principal hydrotreatment reactors. The value for the HSV of each swing reactor when operating is preferably 0.25 to 4 $h^{-1}$, usually 1 to 2 $h^{-1}$. The overall HSV value for the swing reactors and that of each reactor is selected so as to produce the maximum HDM while controlling the reaction temperature (limiting exothermicity).

In a preferred embodiment, a catalyst conditioning section is used that allows swinging of these guard zones in operation, i.e. without stopping operation of the unit: firstly, a system which functions at moderate pressure (from 1 MPa to 5 MPa, preferably 1.5 MPa to 2.5 MPa) can be used to carry out the following operations on the disconnected guard reactor: washing, stripping, cooling, before discharging the spent catalyst; then heating and sulphurization after charging with fresh catalyst; then another pressurization/depressurization system and taps and valves of appropriate technology can be used to swing these guard zones without stopping the unit, i.e. without affecting the operating factor, since all of the washing, stripping, spent catalyst discharging, fresh catalyst recharging, heating and sulphurization operations take place on a disconnected reactor or guard zone. Alternatively, a pre-sulphurized catalyst may be used in the conditioning section so as to simplify the in-operation swing operation.

The effluent leaving the swing reactors is then sent to the principal hydrotreatment reactors.

In another variation, at the inlet to each guard zone the feed passes through a filter plate located upstream of the catalytic bed(s) contained in the guard zone. This filter plate, described in patent FR2889973, can be used to trap plugging particles contained in the feed by means of a specific distributor plate comprising a filter medium.

In yet another variation, the filter plate may be installed at the inlet to each of the HDM, HCK and HDS zones.

In general, each HDM, HCK or HDS zone or guard zone contains at least one catalytic bed (for example 1, 2, 3, 4 or 5 catalytic beds). Preferably, each guard zone contains a catalytic bed. Each catalytic bed contains at least one catalytic layer containing one or more catalysts, optionally preceded by at least one inert layer, for example of alumina or ceramic in the form of extrudates, beads or pellets. The catalysts used in the catalytic bed(s) may be identical or different.

The Hydrocracking Step (HCK) (Step b)

In accordance with the invention, at least a portion and preferably all of the at least partially demetallized effluent is hydrocracked in a HCK section containing at least one HCK catalyst.

In a preferred variation, the HCK step comprises one or more fixed bed HCK zones preceded by at least two HCK guard zones, also in fixed bed mode, disposed in series for use in a cyclic manner. The operation of these guard zones is identical to the operation described in the case of HDM. The system of swing reactors upstream of the HCK section means that the service life of the HCK catalysts can be increased. The catalyst and the operating conditions for the HCK swing reactors are generally identical to the principal HCK reactors.

In yet another variation, a filter plate may be installed at the inlet to the HCK section, either at the inlet to the principal HCK reactors or at the inlet to the swing HCK reactors.

The hydrocracking step may advantageously be carried out at a temperature in the range 300° C. to 500° C., preferably in the range 350° C. to 420° C. and at an absolute pressure in the range 2 MPa to 35 MPa, preferably in the range 10 to 20 MPa. Usually, the HSV is in the range $0.1\ h^{-1}$ to $5\ h^{-1}$, preferably in the range $0.1\ h^{-1}$ to $2\ h^{-1}$. The quantity of hydrogen mixed with the HCK feed is normally 100 to 5000 normal cubic meters ($Nm^3$) per cubic meter ($m^3$) of liquid feed, usually 200 to 2000 $Nm^3/m^3$ and preferably 300 to 1500 $Nm^3/m^3$. Normally, the hydrocracking step is carried out industrially in one or more liquid downflow reactors.

The degree of conversion in the HCK step is generally more than 20%, preferably more than 30%, more preferably more than 35%. It is generally less than 60%. The degree of conversion is defined as being the fraction by weight of organic compounds with a boiling point of more than 343° C. at the inlet to the reaction section minus the fraction by weight of organic compounds with a boiling point of more than 343° C. at the outlet from the reaction section, all divided by the fraction by weight of organic compounds with a boiling point of more than 343° C. at the inlet to the reaction section.

In order to activate the HCK reactions proper, said catalyst should advantageously be a bifunctional catalyst, with a hydrogenating phase in order to be able to hydrogenate the aromatics and produce equilibrium between the saturated compounds and the corresponding olefins and an acid phase which can be used to promote the hydroisomerization and hydrocracking reactions. The acid function is advantageously provided by supports with large surface areas (generally 100 to 800 $m^2/g$) with a superficial acidity, such as halogenated (primarily chlorinated or fluorinated) aluminas, combinations of boron oxides and aluminium, amorphous silica-aluminas and zeolites. The hydrogenating function is advantageously provided either by one or more metals from group VIII of the periodic classification of the elements, such as iron, cobalt, nickel, ruthenium, rhodium, palladium, osmium, iridium and platinum, or by an association of at least one metal from group VIB of the periodic classification of the elements, such as molybdenum or tungsten, and at least one non-noble metal from group VIII (such as nickel or cobalt). The hydrocracking catalyst should also advantageously have a high resistance to impurities and to asphaltenes because a heavy feed is used.

Preferably, the HCK catalysts used comprise at least one metal selected from the group formed by metals from groups VIII and VIB, taken alone or as a mixture, and a support comprising 10% to 90% by weight of a zeolite containing iron and 90% to 10% by weight of inorganic oxides. The metal from group VIB employed is preferably selected from tungsten and molybdenum and the metal from group VIII is preferably selected from nickel and cobalt. The HCK catalysts are preferably prepared using the preparation method described in Japanese patent number 2289 419 (IKC) or EP 0 384 186.

Examples of this type of catalyst are described in patents JP 2966 985, JP 2908 959, JP 01 049399 and JP 61 028717, U.S. Pat. No. 4,446,008, U.S. Pat. No. 4,622,127, U.S. Pat. No. 6,342,152, EP 0 537 500 and EP 0 622 118.

In another preferred variation, the catalyst used is a catalyst based on nickel and tungsten on a silica-alumina support.

Prior to injecting the feed, the catalysts used in the process of the present invention preferably undergo a sulphurization treatment (in situ or ex situ).

The Fractionation Step (Step c)

The at least partially hydrocracked effluent undergoes at least one fractionation step, optionally completed by other supplemental fractionation steps, allowing at least a light fraction and a heavy fraction to be separated.

This separation avoids overcracking of the light fraction in the HDS step. It can also be used to reduce the investment costs of the HDS reactor (less feed to be treated, less catalyst, etc.) or to increase the residence time in the HDS reactor and thus to improve desulphurization. The separation can in particular be used to eliminate light gases and thus to allow the partial pressure of hydrogen necessary for intense HDS to be maximized by subsequently reinjecting hydrogen.

The fractionation step c) preferably comprises a flash separation using an inter-step separator. Separation is not carried out with a precise cut point; rather, it is a flash separation. If a cut point had to be mentioned, then it could be said to be between 200° C. and 450° C.

The fractionation step may advantageously be completed by means of any method known to the skilled person such as, for example, combining one or more high and/or low pressure separators, and/or distillation steps and/or high and/or low pressure stripping steps and/or liquid/liquid extraction steps and/or solid/liquid separation steps and/or centrifuging steps.

In a variation, at least a portion, preferably all, of the heavy fraction is then sent to the hydrodesulphurization step.

In another variation, the fractionation step additionally comprises atmospheric distillation of the heavy fraction which can be used to obtain an atmospheric distillate and an atmospheric residue.

In another variation, the fractionation step also comprises vacuum distillation of the atmospheric residue or of the heavy fraction obtained from flash separation in order to obtain a vacuum distillate and a vacuum residue.

Thus, the heavy fraction is fractionated by atmospheric distillation into at least one atmospheric distillate fraction containing at least one light hydrocarbon fraction of the naphtha, kerosene and/or diesel type and an atmospheric residue fraction. At least a portion of the atmospheric residue fraction may also be fractionated by vacuum distillation into a vacuum distillate fraction and a vacuum residue fraction. At least a portion of the vacuum residue fraction and/or of the atmospheric residue fraction is advantageously sent to the hydrodesulphurization step.

The fractions obtained from the fractionation step which are not sent to the HDS step (such as the light fraction obtained from flash separation or the atmospheric distillate fraction or indeed the vacuum distillate fraction) may undergo subsequent post-treatments.

The Hydrodesulphurization Step (HDS) Step d)

In accordance with the invention, at least a portion, preferably all of the heavy fraction obtained after the fractionation step is desulphurized in a fixed bed HDS section containing at least one HDS catalyst. This heavy fraction undergoing the HDS step may either be at least a portion of the heavy fraction obtained by flash separation of the at least partially hydrocracked effluent, or at least a portion of the atmospheric residue obtained by atmospheric distillation or at least a portion of the vacuum residue obtained by vacuum distillation, or a mixture of these fractions.

In a preferred variation, said heavy fraction undergoes a hydrodesulphurization treatment in a fixed bed hydrodesulphurization section comprising one or more fixed bed hydrodesulphurization zones preceded by at least two hydrodesulphurization guard zones, also fixed bed, disposed in series for use in a cyclic manner consisting of the successive repetition of steps d") and d''') defined below:

d') a step in which the guard zones are used together for a period at most equal to the deactivation and/or plugging time of one of them;

d") a step during which the deactivated and/or plugged guard zone is short-circuited and the catalyst it contains is regenerated and/or replaced by fresh catalyst, and during which the other guard zone(s) is/are in use; and d'") a step during which the guard zones are used together, the guard zone for which the catalyst has been regenerated during the preceding step being reconnected and said step being continued for a period at most equal to the deactivation and/or plugging time of one of the guard zones.

The operation of these guard zones is identical to the operation described in the case of HDM. The catalyst as well as the operating conditions for the HDS swing reactors are generally identical to the principal HDS reactors.

The system of swing reactors upstream of the HDS section means that the HDS catalysts can be protected and their service life increased. In fact, during hydrocracking, and in particular when conversion is high, sediments (precipitated asphaltenes) may be formed in the heavy fraction. It is advantageous to eliminate them in the HDS swing reactors before carrying out HDS in the principal reactors in order to prevent any plugging of the fixed beds of the principal section. It is also advantageous to eliminate them in order to comply with the recommendation of a quantity of sediments after ageing of 0.1% by weight of less for fuel bases.

In yet another variation, a filter plate may be installed at the inlet to the HDS section, either at the inlet to the principal HDS reactors or at the inlet to the swing HDS reactors.

The hydrodesulphurization step may advantageously be carried out at a temperature in the range 300° C. to 500° C., preferably in the range 350° C. to 420° C., and at an absolute pressure in the range 2 MPa to 35 MPa, preferably in the range 10 to 20 MPa. Usually, the HSV is in the range $0.1\ h^{-1}$ to $5\ h^{-1}$, preferably in the range $0.1\ h^{-1}$ to $2\ h^{-1}$. The quantity of hydrogen mixed with the feed for the HDS section is normally 100 to 5000 normal cubic meters ($Nm^3$) per cubic meter ($m^3$) of liquid feed, usually 200 to 2000 $Nm^3/m^3$ and preferably 300 to 1500 $Nm^3/m^3$. Normally, the hydrodesulphurization step is carried out industrially in one or more liquid downflow reactors.

In order to facilitate hydrodesulphurization, the operation has to be carried out at a high partial pressure of hydrogen ($ppH_2$) (i.e. a higher concentration of hydrogen in the gas) which is possible via the upstream fractionation step which eliminates the light compounds and prevents dilution of the $H_2$ in the HDS step. The hydrogen is then reinjected into the HDS step after fractionation with the heavy fraction. The hydrogen may be makeup hydrogen and/or hydrogen recycled from the process or from another process. If necessary, the HDS section may be supplied solely with makeup hydrogen in order to favour HDS. The $ppH_2$ at the HDS inlet is more than 12 MPa, preferably more than 13 MPa.

In order to promote HDS and reduce the Conradson carbon, the ideal catalyst must have a high hydrogenating power in order to carry out intense refining of the products: desulphurization, denitrogenation, and possibly continuation of demetallization and reduction of the asphaltenes content.

The HDS catalyst advantageously comprises a matrix and at least one hydrodehydrogenating element selected from the group formed by elements from group VIB and from group VIII of the periodic classification of the elements.

The matrix is advantageously constituted by compounds, used alone or as a mixture, such as alumina, halogenated alumina, silica, silica-alumina, clays (selected, for example, from natural clays such as kaolin or bentonite), magnesia, titanium oxide, boron oxide, zircon, aluminium phosphates, titanium phosphates, zirconium phosphates, coal, or aluminates. Preferably, the matrix contains alumina, in any of its forms known to the skilled person; more preferably the matrix is gamma alumina.

The hydrodehydrogenating element is advantageously selected from the group formed by elements from group VIB and non-noble group VIII of the periodic classification of the elements. Preferably, the hydrodehydrogenating element is selected from the group formed by molybdenum, tungsten, nickel and cobalt. More preferably, the hydrodehydrogenating element comprises at least one element from group VIB and at least one non-noble element from group VIII. This hydrodehydrogenating element may, for example, comprise a combination of at least one element from group VIII (Ni, Co) with at least one element from group VIB (Mo, W). Preferably, the hydrodesulphurization catalyst comprises, also advantageously, at least one doping element deposited on said catalyst and selected from the group formed by phosphorus, boron and silicon.

The preferred HDS catalyst comprises at least one metal selected from the group formed by metals from groups VIII and VIB, taken alone or as a mixture, on a porous refractory oxide as a support, said support generally being selected from the group formed by alumina, silica, silica-aluminas, magnesia, clays and mixtures of at least two of these minerals. Particularly preferred HDS catalysts are CoMo, NiMo and/or NiW catalysts on alumina, and also CoMo, NiMo and/or NiW catalysts on alumina doped with at least one element selected from the group of atoms formed by phosphorus, boron and silicon.

Examples of catalysts that may be used in the HDS step are indicated in patents EP113297, EP113284, U.S. Pat. No. 6,589,908, U.S. Pat. No. 4,818,743 and U.S. Pat. No. 6,332,976.

Prior to injecting the feed, the catalysts used in the process of the present invention preferably undergo a sulphurization treatment as described above.

Separation of Desulphurized Effluent (Step e)

In a routine implementation of the invention, the effluent obtained in the HDS step d) is sent at least in part, preferably in its entirety, to a separation step termed step e).

The separation step may advantageously be carried out using any method known to the skilled person such as, for example, a combination of one or more high and/or low pressure separators and/or distillation steps and/or high and/or low pressure stripping steps, and/or liquid/liquid extraction steps and/or solid/liquid separation steps and/or centrifuging steps.

Preferably, the separation step e) can be used to obtain a gaseous phase, at least one light hydrocarbon fraction of the naphtha, kerosene and/or diesel type, a vacuum distillate fraction and a vacuum residue fraction and/or an atmospheric residue fraction.

Preferably, at least a portion of the effluent obtained in the hydrodesulphurization step d) is sent to a separation step comprising an atmospheric distillation and a vacuum distillation and in which the effluent from the hydrodesulphurization step is fractionated by atmospheric distillation into a gas fraction, at least one atmospheric distillate fraction containing fuel bases and an atmospheric residue fraction, at least a portion of the atmospheric residue then being fractionated by vacuum distillation into a vacuum distillate fraction and a vacuum residue fraction.

The vacuum residue fraction and/or the vacuum distillate fraction and/or the atmospheric residue fraction may in part constitute at least fuel bases with a sulphur content of 0.5% by weight or less. The vacuum distillate fraction may constitute a fuel base with a sulphur content of close to 0.1% by weight.

Upgrading the various fuel base cuts (LPG, naphtha, kerosene, and/or diesel) obtained is not an aim of the present invention and these methods are familiar to the skilled person. The products obtained may be integrated into fuel pools or may undergo supplemental refining steps. The naphtha, kerosene, gas oil and vacuum gas oil fraction(s) may undergo one or more treatments (hydrotreatment, hydrocracking, alkylation, isomerization, catalytic reforming, catalytic cracking or thermal cracking or the like) to bring them to the required specifications (sulphur content, smoke point, octane, cetane number, etc.) separately or as a mixture.

The gaseous fractions obtained from separation step e) preferably undergo a purification treatment in order to recover the hydrogen and recycle it to the hydrotreatment and/or hydroconversion reactors. This is also the case for the light fraction originating from the inter-step separator between the HCK and the HDS steps.

A portion of the vacuum residue and/or atmospheric residue and/or vacuum distillate residues obtained in step e) may also be recycled to the hydrodemetallization step a) and/or to the hydrocracking step b). These recycles can be used to significantly increase the yield of light products that may be upgraded to fuels, for example, and their diluting effect on asphaltenes, metals and nitrogen can prolong catalyst service life.

At least a portion of one of the naphtha, kerosene and/or diesel type hydrocarbon fractions obtained in step e) may be recycled to the hydrodemetallization step a). These recycles can be used to treat highly viscous feeds.

In order to constitute a fuel complying with recommendations regarding a sediment content after ageing of 0.1% or less, the fuel bases may undergo a step for separating sediments and catalyst fines, preferably after the separation step e). Preferably, at least a portion of the vacuum residue and/or vacuum distillate and/or atmospheric residue fractions obtained from separation step e) undergoes separation of sediments and fines using at least one filter such as a rotary filter or a basket filter, or a centrifuging system such as a hydrocyclone associated with filters, or in-line decanting.

Catalytic Cracking (Step f)

In a variation, at least a portion of the vacuum distillate fraction and/or the vacuum residue fraction obtained from step e) is sent to a catalytic cracking section denoted step f) in which it is treated under conditions that can produce a gaseous fraction, a gasoline fraction, a diesel fraction and a residual fraction.

In one implementation of the invention, at least a portion of the residual fraction obtained in catalytic cracking step f), often termed the slurry fraction by the skilled person, is recycled to the inlet to step a). The residual fraction may also be sent at least in part or even in its entirety to the heavy fuel storage zone of the refinery.

In a particular implementation of the invention, a portion of the gas oil fraction (or LCO) and/or a portion of the residual fraction (containing the HCO) obtained during this step e) may be used to constitute fluxing bases which will be mixed with the fuel bases obtained by the present process.

The catalytic cracking step f) is usually a fluidized bed catalytic cracking step, for example using the process developed by the Applicant and known as R2R. This step may be carried out in a conventional manner known to the skilled person under conditions suitable for cracking with a view to producing hydrocarbon products with lower molecular weights. Descriptions of the operation and catalysts for use in the context of fluidized bed cracking in this step e) have been described, for example, in patent documents U.S. Pat. No. 4,695,370, EP184517, U.S. Pat. No. 4,959,334, EP323297, U.S. Pat. No. 4,965,232, U.S. Pat. No. 5,120,691, U.S. Pat. No. 5,344,554, U.S. Pat. No. 5,449,496, EP485259, U.S. Pat. No. 5,286,690, U.S. Pat. No. 5,324,696, EP542604 and EP699224.

The fluidized bed catalytic cracking reactor may operate in upflow or downflow mode. Although this is not a preferred implementation of the present invention, it is also possible to envisage carrying out catalytic cracking in a moving bed reactor. Particularly preferred catalytic cracking catalysts are those which contain at least one zeolite, usually mixed with an appropriate matrix such as alumina, silica or silica-alumina, for example.

Fluxing

In order to constitute a fuel complying with viscosity recommendations, namely 380 cSt or less (50° C.), fuel bases obtained by the present process (thus the atmospheric residue and/or vacuum distillate and/or vacuum residue) may be mixed, if necessary, with fluxing bases in order to reach the target viscosity of the desired fuel grade.

The fluxing bases may be selected from light cycle oil (LCO) from catalytic cracking, heavy cycle oils (HCO) from catalytic cracking, catalytic cracking residue, kerosene, gas oil, vacuum distillate and/or a decanted oil.

Preferably, kerosene, gas oil and/or vacuum distillate obtained in separation step e) of the process after hydrodesulphurization is used, or gas oil and/or a portion of the residual fraction (in particular containing heavy HCO oil) obtained in catalytic cracking step f) is used.

BRIEF DESCRIPTION OF THE FIGURES

The figures below show an advantageous embodiment of the invention. Essentially, the unit and process of the invention will be described. The operating conditions described above will not be reiterated.

FIG. 1 describes the process of the invention. For better readability, the operation of the guard zones in the hydrodemetallization section of FIG. 1 is described in FIG. 2.

Figure 1:
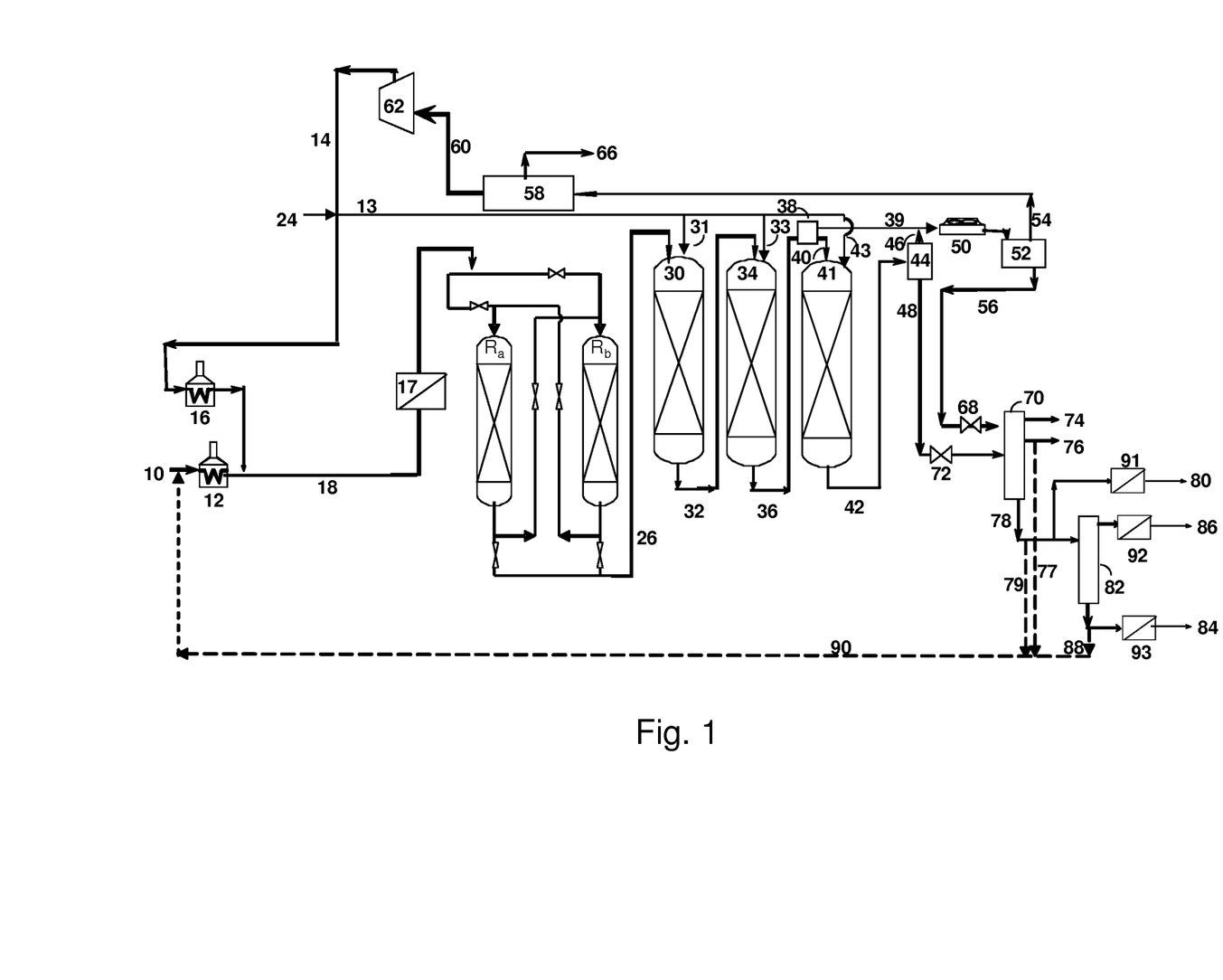

In FIG. 1, the feed 10, preheated in the chamber 12, mixed with recycled hydrogen 14 and makeup hydrogen 24 preheated in the chamber 16, is introduced into the guard zone system via the conduit 18. It optionally passes through a filter 17.

Figure 2:
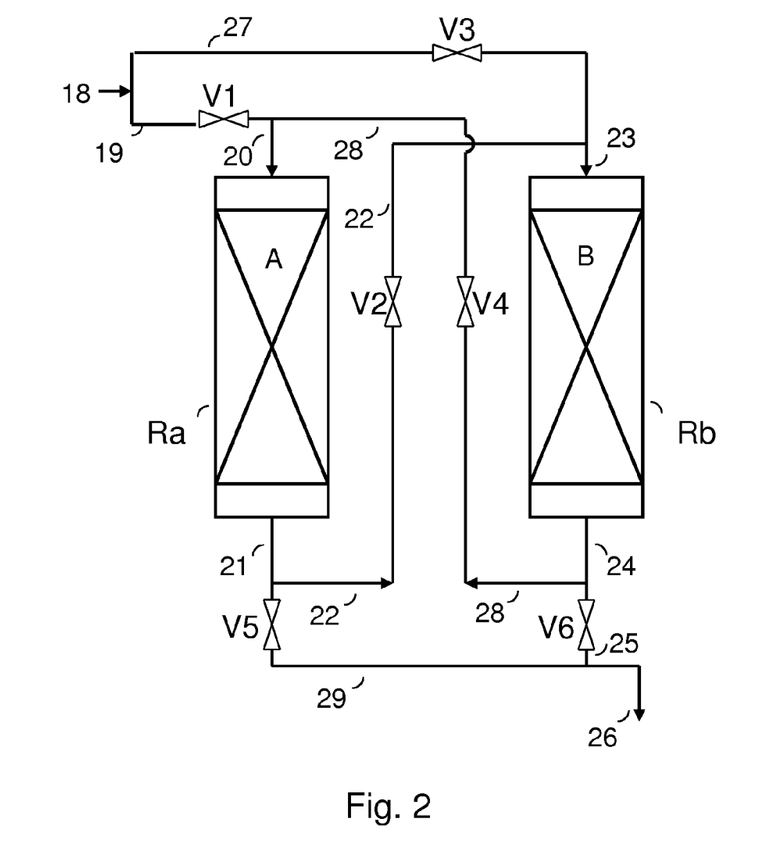

Referring now to FIG. 2, the operation of the guard zones in the hydrodemetallization section comprising two guard zones (or swing reactors) Ra and Rb comprises a series of cycles each comprising four successive steps:
- a first step (step a') during which the feed passes successively through the reactor Ra then the reactor Rb;
- a second step (step a'') during which the feed passes through only reactor Rb, the reactor Ra being short-circuited for regeneration and/or replacement of the catalyst;

a third step (step a''') during which the feed passes successively through reactor Rb then reactor Ra;

a fourth step (step a'''') during which the feed passes only through reactor Ra, reactor Rb being short-circuited for regeneration and/or replacement of the catalyst.

During step a'), the preheated feed is introduced via the line 18 and the line 19 comprising a valve V1 which is open to the line 20 and the guard reactor Ra comprising a fixed bed A of catalyst. During this period, valves V3, V4 and V5 are closed. The effluent from reactor Ra is sent via the conduit 21, the conduit 22 comprising an open valve V2 and the conduit 23 in the guard reactor Rb comprising a fixed bed B of catalyst. The effluent from reactor Rb is sent via the conduits 24 and 25 comprising an open valve V6 and the conduit 26 to the principal HDM section which will be described below.

During step a''), the valves V1, V2, V4 and V5 are closed and the feed is introduced via the line 18 and the line 27 comprising a valve V3 open towards the line 23 and the reactor Rb. During this period, the effluent from reactor Rb is sent via the conduits 24 and 25 comprising an open valve V6 and the conduit 26 to the principal HDM section.

During step a'''), the valves V1, V2 and V6 are closed and the valves V3, V4 and V5 are open. The feed is introduced into the reactor Rb via the line 18 and the lines 27 and 23. The effluent from reactor Rb is sent via the conduit 24, the conduit 28 comprising an open valve V4 and the conduit 20 to the guard reactor Ra. The effluent from the reactor Ra is sent via the conduits 21 and 29 comprising an open valve V5 and the conduit 26 to the principal HDM section.

During step a''''), the valves V2, V3, V4 and V6 are closed and the valves V1 and V5 are open. The feed is introduced into the reactor Ra via the line 18 and the lines 19 and 20. During this period, the effluent from reactor Ra is sent via conduits 21 and 29 comprising an open valve V5 and the conduit 26 to the principal HDM section. Then the cycle starts again.

The effluent leaving the guard reactor or reactors via the line 26 is optionally remixed with hydrogen (makeup and/or recycled) coming via the conduit 13 then the conduit 31 into a principal HDM reactor 30 which comprises a fixed bed of catalyst. For ease of comprehension, a single HDM, HCK and HDS reactor is shown in the figure, but the HDM, HCK and HDS zone conventionally comprises several reactors in series per section. If necessary, the recycled and/or makeup hydrogen may also be introduced into the reactors between the various catalytic beds (quench) (not shown).

The effluent from the HDM reactor is withdrawn via the conduit 32 then sent to the first HCK reactor 34 where it passes through a fixed bed of catalyst. Hydrogen is optionally injected via the conduit 33.

The effluent treated in the HCK step is sent via the line 36 to an inter-step separator 38 from which a light fraction 39 and a heavy fraction 40 are recovered.

The heavy fraction 40 is sent to the first HDS reactor 41 where it passes through a fixed bed of catalyst. Hydrogen is reinjected via the conduit 43.

The effluent treated in the hydrodesulphurization step is sent via the line 42 to a separator (high pressure high temperature, (HPHT)) 44 from which a gaseous fraction 46 and a liquid fraction 48 are recovered. The gaseous fraction 46, preferably as a mixture with the light fraction 39 obtained from the inter-step separator 38, generally via an exchanger (not shown) or an air-cooled exchanger 50 for cooling, is sent to a high pressure low temperature (HPBT) separator 52 from which a gaseous fraction 54 containing gases ($H_2$, $H_2S$, $NH_3$, C1-C4 hydrocarbons, etc.) and a liquid fraction 56 are recovered.

The gaseous fraction 54 of the high pressure low temperature (HPBT) separator 52 is treated in a hydrogen purification unit 58 from which hydrogen 60 is recovered for recycling, via the compressor 62 and the line 14, to the swing reactors or to the principal HDM, HCK and/or HDS reactors via the line 13. The gases containing the unwanted nitrogen-containing and sulphur-containing compounds are evacuated from the unit (flux 66).

The liquid fraction 56 from the high pressure low temperature (HPBT) separator 52 is depressurized in the device 68 then sent to the fractionation system 70.

The liquid fraction 48 obtained from the high pressure high temperature (HPHT) section 44 is depressurized in the device 72 then sent to the fractionation system 70. Clearly, the fractions 56 and 48 may be sent together, after depressurization, to the system 70. The fractionation system 70 comprises an atmospheric distillation system for producing a gaseous effluent 74, at least one fraction termed the light fraction 76 and in particular containing naphtha, kerosene and diesel and an atmospheric residue fraction 78. All or part of the atmospheric residue fraction 78 is sent to a vacuum distillation column 82 to recover a fraction 84 containing the vacuum residue and a vacuum distillate fraction 86 containing vacuum gas oil.

Optionally, the atmospheric residue fraction 80, the vacuum distillate fraction 86 and/or the vacuum residue fraction 84 which constitute the desired fuel bases may undergo a step for separating fines and sediments via filters 91, 92 and 93 respectively, for example.

A portion of the vacuum residue fraction 88, optionally mixed with a portion of the atmospheric residue fraction 79 and/or with at least a portion of a light fraction 77 in particular containing naphtha, kerosene and diesel, may be recycled to the HDM reactor (and/or to the HCK reactor, not shown) via the line 90.

A portion of the atmospheric residue fraction may also be sent to another process (hydrocracking or catalytic cracking or hydrotreatment).

EXAMPLES

The following examples illustrate the invention without, however, limiting the scope.

Example 1: Hydroconversion by HDM, HCK, Separation then HDS (in Accordance with the Invention)

An atmospheric residue originating from the Middle East containing 10% by weight of asphaltenes, 170 ppm by weight of metals and 4.6% by weight of sulphur was treated in a hydroconversion section comprising a HDM section, a HCK section, an inter-step separator and a HDS section. The operating conditions in the three sections, HDM, HCK and HDS, were identical and are shown in Table 1. HDM was carried out with a CoMoNiP catalyst; HCK was carried out with a NiW catalyst on an amorphous silica-alumina support, HDS was carried out with a CoMoNiP catalyst.

Given that the light fraction is removed with the $H_2$ by separation, hydrogen was reinjected at the HDS inlet. Because of the separation step, the heavy fraction entering the HDS section was reduced. The residence time was thus longer and also favoured more intense HDS.

TABLE 1

Operating conditions with separator

| Catalysts | HDM + HCK + SEP + HDS |
|---|---|
| Mean temperature (° C.) | 390 |
| Total pressure (MPa) | 15 |
| Overall HSV (Sm³/h feed*/m³ of catalyst) | 0.15 |
| H₂ unit inlet (Nm³/m³ feed) | 1000 |
| H₂ HDS inlet (Nm³/m³ feed) | 820 |
| PP**H₂ HDS inlet (MPa) | 13.4 |
| PP**H₂S HDS inlet (MPa) | 0.08 |
| C5⁺ HDS inlet/C5⁺ HCK effluent (% by wt) | 68 |

*feed = feed at unit inlet;

**PP = partial pressure

Example 2: Hydroconversion by HDM, then HCK, then HDS (No Separation) (not in Accordance with the Invention)

The same feed was treated as in Example 1 in a section comprising a HDM section, a HCK section and a HDS section. In this example, separation between the HCK section and the HDS section was not carried out. The operating conditions in the three sections, HDM, HCK and HDS, are shown in Table 2. The catalysts and their quantities were identical to those in Example 1

TABLE 2

Operating conditions without separator

| Catalysts | HDM + HCK + HDS |
|---|---|
| Mean temperature (° C.) | 390 |
| Total pressure (MPa) | 15 |
| Overall HSV (Sm³/h feed*/m³ of catalyst) | 0.15 |
| H₂ unit inlet (Nm³/m³ feed) | 1000 |
| H₂ HDS inlet (Nm³/m³ feed) | 820 |
| PPH₂ HDS inlet (MPa) | 12.4 |
| PPH₂S HDS inlet (MPa) | 0.25 |
| C5⁺ HDS inlet/C5⁺ HCK effluent (% by wt) | 100 |

The yield and the sulphur content of each fraction obtained from the effluent leaving the HDS section are given in Table 3.

TABLE 3

Yields and sulphur content of effluent from the HDS section (% by wt/feed)

| | Example 1 (with separator) | | Example 2 (without separator) | |
|---|---|---|---|---|
| Products | Yield (% by wt/feed) | S (% by wt) | Yield (% by wt/feed) | S (% by wt) |
| NH₃ | 0.2 | — | 0.2 | — |
| H₂S | 4.6 | 94.12 | 4.0 | 94.12 |
| C1-C4 (gas) | 2.9 | — | 4.9 | — |
| Naphtha (IP-157° C.) | 10.8 | 0.01 | 9.3 | 0.01 |
| Diesel + kerosene (157- 343° C.) | 20.9 | 0.05 | 20.5 | 0.02 |
| Vacuum distillate (343-525° C.) | 26.3 | 0.13 | 26.5 | 0.14 |
| Vacuum residue (525° C.+) | 36.2 | 0.48 | 36.5 | 0.73 |

Yields and % by weight after remixing in the «with separator» case.

The conversion is given in Table 4. It was calculated in the following manner:

343⁺ conversion=(343⁺ feed−343⁺ effluent)/(343⁺ feed)

TABLE 4

Conversion

| | Example 1 (with separator) | Example 2 (without separator) |
|---|---|---|
| 343° C.⁺ feed (% by wt/feed) | 97.2 | 97.2 |
| 343° C.⁺ effluent (% by wt/feed) | 62.5 | 62.9 |
| 343° C.⁺ conversion | 35.7 | 35.2 |

It will be observed that the process of the invention can be used to obtain the desired fuel bases (naphtha+kerosene+diesel) in a yield of approximately 32%.

The vacuum residue and the vacuum distillate obtained had a sulphur content below 0.5% by weight and constituted the bases of choice for bunker fuel pools with low sulphur contents (<0.5% by weight). By mixing these fractions, a marine fuel was obtained with a sulphur content of 0.33% by weight and a viscosity of 380 cSt at 50° C.

The vacuum distillate may also constitute a base of choice for a marine fuel with a very low sulphur content (0.13% by weight).

The invention claimed is:

1. A process for the conversion of a hydrocarbon feed with a sulphur content of at least 0.1% by weight, an initial boiling point of at least 300° C. and an end point of at least 440° C., comprising:

a) hydrodemetallization treatment of said feed in a fixed bed hydrodemetallization section comprising one or more fixed bed hydrodemetallization zones preceded by at least two hydrodemetallization guard zones in fixed bed, disposed in series in a cyclic manner, with successive repetition of a") and a''') defined below:

a') using guard zones together for a period at most equal to deactivation and/or plugging time of one guard zone;

a") short-circuiting a deactivated and/or plugged guard zone and regenerating catalyst therein and/or replacing with fresh catalyst, and during which an other guard zone(s) is/are in use; and a''') using guard zones together, a guard zone in which catalyst that has been regenerated is reconnected and hydrodemetallization being continued for a period at most equal to the deactivation and/or plugging time of one of the guard zones; sending partially demetallized effluent from a) directly to b), b) hydrocracking at least a portion of at least partially demetallized effluent from said a) hydrodemetallization section in a hydrocracking section containing at least one fixed bed hydrocracking catalyst;

c) fractionating at least a portion of at least partially hydrocracked effluent in order to obtain a light fraction and a heavy fraction;

d) hydrodesulfurizing at least a portion of said heavy fraction in a hydrodesulfurization section containing at least one fixed bed hydrodesulfurization catalyst, and into which hydrogen is reinjected, at least a portion of the effluent obtained from hydrodesulfurization d) is sent to separation e) comprising atmospheric distillation and vacuum distillation, and in which effluent from hydrodesulfurization is fractionated by atmospheric distillation into a gaseous fraction, at least one atmospheric distillate fraction containing fuel bases and an atmospheric residue fraction, and at least a portion of the atmospheric residue is then fractionated by vacuum distillation into a vacuum distillate fraction and a vacuum residue fraction.

2. The process according to claim 1, in which hydrodemetallization, hydrocracking or hydrodesulphurization are carried out at a temperature of 300° C. to 500° C., at an absolute pressure of 2 to 35 MPa, with an hourly space velocity of 0.1 to 5 $h^{-1}$ and the quantity of hydrogen mixed with the feed of each section is in the range 100 to 5000 $Nm^3/m^3$.

3. The process according to claim 1, in which the hydrocarbon feed is selected from the group consisting of atmospheric residues, vacuum residues from straight run distillation, crude oils, topped crude oils, deasphalted oils, residues obtained from conversion processes, heavy oils of any origin, bituminous sands, their derivatives, and oil shales or their derivatives, used alone or as a mixture.

4. The process according to claim 1, in which a co-feed is introduced with the feed, the co-feed being gas oil or vacuum distillate fractions obtained from distillation or from a conversion process, a light cycle oil, a heavy cycle oil, a decanted oil, a fluidized bed catalytic cracking residue, cuts from a coal or biomass liquefaction process, aromatic extracts, pyrolysis oil, vegetable, algae or animal oils, used alone or as a mixture.

5. The process according to claim 1, in which fractionation c) comprises a flash separation via an inter-step separator.

6. The process according to claim 1, in which fractionation additionally comprises an atmospheric distillation of the heavy fraction obtaining an atmospheric distillate and an atmospheric residue.

7. The process according to claim 5, in which fractionation additionally comprises vacuum distillation of atmospheric residue or of a heavy fraction obtained from flash separation in order to obtain a vacuum distillate and a vacuum residue.

8. The process according to claim 1, in which in hydrodesulfurization d), said heavy fraction undergoes a hydrodesulfurization treatment in a fixed bed hydrodesulfurization section comprising one or more fixed bed hydrodesulfurization zones preceded by at least two fixed bed hydrodesulfurization guard zones, disposed in series in a cyclic manner, with the successive repetition of d") and d"') defined below:

d') using guard zones together for a period at most equal to the deactivation and/or plugging time of one guard zone;

d") short-circuiting a deactivated and/or plugged guard zone and regenerating catalyst therein and/or replacing with fresh catalyst, and during which an other guard zone(s) is/are in use; and d"') using guard zones are used together, a guard zone in which catalyst that has been regenerated is reconnected and hydrodesulfurization being continued for a period at most equal to the deactivation and/or plugging time of one of the guard zones.

9. The process according to claim 1, in which a portion of the vacuum residue fractions and/or atmospheric residue and/or vacuum distillate is recycled to hydrodemetallization a) and/or to hydrocracking b).

10. The process according to claim 1, in which at least a portion of at least one of naphtha, kerosene and/or diesel hydrocarbon fractions is recycled to hydrodemetallization a).

11. The process according to claim 1, in which at least a portion of the atmospheric residue and/or vacuum distillate and/or vacuum residue fractions undergoes separation of sediments and catalyst fines using at least one filter, a centrifuging system or in-line decanting.

12. The process according to claim 1, in which the atmospheric residue and/or the vacuum distillate and/or the vacuum residue are mixed with fluxing bases of light cycle oils from catalytic cracking, heavy cycle oils from catalytic cracking, a catalytic cracking residue, kerosene, gas oil, vacuum distillate and/or a decanted oil.

13. The process according to claim 1, in which at least a portion of the vacuum distillate fraction and/or the vacuum residue fraction is sent to a catalytic cracking section f), in which it is treated under conditions which can produce a gas oil fraction (or light cycle oil LCO) and/or a residual fraction (containing heavy cycle oil, HCO).

14. The process according to claim 12, in which the fluxing bases are from kerosene, gas oil and/or vacuum distillate obtained in separation e) of the process after hydrodesulfurization.

15. The process according to claim 13, in which the atmospheric residue and/or the vacuum distillate and/or the vacuum residue are mixed with fluxing bases of a gas oil fraction (or light cycle oil, LCO) and/or a residual fraction (containing heavy cycle oil, HCO) obtained in catalytic cracking f).

16. The process according to claim 1, wherein ppH2 at a hydrodesulfurization inlet is more than 12 MPa.

17. A process for the conversion of a hydrocarbon feed with a sulphur content of at least 0.1% by weight, an initial boiling point of at least 300° C. and an end point of at least 440° C., consisting of:

a) hydrodemetallization treatment of said feed in a fixed bed hydrodemetallization section comprising one or more fixed bed hydrodemetallization zones preceded by at least two hydrodemetallization guard zones in fixed bed, disposed in series in a cyclic manner, with successive repetition of a") and a"') defined below:

a') using guard zones together for a period at most equal to deactivation and/or plugging time of one guard zone;

a") short-circuiting a deactivated and/or plugged guard zone and regenerating catalyst therein and/or replacing with fresh catalyst, and during which an other guard zone(s) is/are in use; and a"') using guard zones together, a guard zone in which catalyst that has been regenerated is reconnected and hydrodemetallization being continued for a period at most equal to the deactivation and/or plugging time of one of the guard zones; sending partially demetallized effluent from a) directly to b), b) hydrocracking at least a portion of at least partially demetallized effluent from said a) hydrodemetallization section in a hydrocracking section containing at least one fixed bed hydrocracking catalyst;

c) fractionating at least a portion of at least partially hydrocracked effluent in order to obtain a light fraction and a heavy fraction;

d) hydrodesulfurizing at least a portion of said heavy fraction in a hydrodesulfurization section containing at least one fixed bed hydrodesulfurization catalyst, and into which hydrogen is reinjected, at least a portion of the effluent obtained from hydrodesulfurization d) is sent to a separation e) comprising atmospheric distillation and vacuum distillation, and in which effluent from hydrodesulfurization is fractionated by atmospheric distillation into a gaseous fraction, at least one atmospheric distillate fraction containing fuel bases and an atmospheric residue fraction, and at least a portion of the atmospheric residue is then fractionated by vacuum distillation into a vacuum distillate fraction and a vacuum residue fraction.

\* \* \* \* \*